United States Patent [19]

Beyer et al.

[11] Patent Number: 5,411,724
[45] Date of Patent: May 2, 1995

[54] METHOD FOR SUBSTITUTION OF ALUMINA IN THE FRAMEWORK OF ZEOLITES BY SILICON

[75] Inventors: Herman K. Beyer; Gabriella Pál-Borbély, both of Budapest, Hungary

[73] Assignee: W. R. Grace & Co.-Conn., New York, N.Y.

[21] Appl. No.: 70,574

[22] Filed: Jun. 2, 1993

[51] Int. Cl.$^6$ .................. C01B 33/26; B01J 29/06
[52] U.S. Cl. ................... 423/328.2; 423/63; 423/64; 423/71; 423/77; 423/79
[58] Field of Search ............... 502/64, 63, 71, 77, 502/79; 423/328.1, 328.2

[56] References Cited

U.S. PATENT DOCUMENTS

| | | |
|---|---|---|
| 3,293,192 | 12/1966 | Maher et al. . |
| 3,402,996 | 9/1968 | Maher et al. . |
| 3,442,795 | 5/1969 | Kerr et al. . |
| 3,449,070 | 6/1969 | McDaniel et al. . |
| 3,640,681 | 2/1972 | Pickert . |
| 3,937,791 | 2/1976 | Garwood et al. . |
| 4,093,560 | 6/1978 | Kerr et al. . |
| 4,273,753 | 6/1981 | Chang . |
| 4,569,833 | 2/1986 | Gortsema et al. . |
| 4,711,770 | 12/1987 | Skeels et al. ............... 502/60 |
| 4,869,803 | 9/1989 | Ward ....................... 502/79 |
| 5,008,233 | 4/1991 | Lambert .................... 502/231 |

OTHER PUBLICATIONS

Sulikowski et al., J. Phys. Chem., 1989, 93, 3240–3243 J. A. Rabo et al. reported in J.W. Hightower (Editor).
H. G. Karge and K. H. Beyer, in Stud. Surf. Sci. Catal. 1991, 69, 43–64.
Barrer and Makki, Canad. Journ. Chem., 1964, 42, 1481–1487.
P. Fejes et al. in React. Kinet. Catal. Lettl 1980, 14, 481–488.
H. K. Beyer and I. Belenykaja described in Stud. Surf. Sci Catal., 180, 5, 203–209.

*Primary Examiner*—Anthony McFarlane
*Attorney, Agent, or Firm*—Beverly K. Johnson

[57] ABSTRACT

Aluminum can be removed from tetrahedral framework sites of zeolite frameworks and substituted with elements such as silicon, gallium, titanium or zirconium. The process involves three steps:

(a) forming a mixture of the ammonium or alkaline metal form of the zeolite in the hydrated state and a crystalline ammonium fluoro-halo-metallate salt;

(b) heating the mixture at elevated temperatures to remove the aluminum from the zeolite and to introduce the metal from the salt into the structure of the zeolitic component by solid-state reaction while forming a fluoro-halo-aluminate complex salt; and (c) removing the formed fluoro-halo-aluminate complex salt.

15 Claims, No Drawings

METHOD FOR SUBSTITUTION OF ALUMINA IN THE FRAMEWORK OF ZEOLITES BY SILICON

FIELD OF THE INVENTION

This invention relates to a novel method for substitution of aluminum in the framework of zeolites by other atoms.

BACKGROUND OF THE INVENTION

In the strict sense of the word, the term "dealumination" refers to the removal of aluminum from zeolite frameworks generally resulting in lattice deficiencies. Nevertheless, in its general use and as it will be used herein it relates to the more complex process which includes the incorporation of other atoms into transient framework vacancies temporarily left by the release of aluminum, such as the isomorphic substitution by silicon into the framework of zeolites.

Zeolitic materials have been demonstrated to have catalytic, adsorption and ion-exchange properties offering a wide field of applications in important industrial processes. Besides the framework topology, the framework Si/Al atomic ratio of zeolites is an important parameter exerting strong influence on properties, such as thermal and hydrothermal stability, hydrophobicity and catalytic activity and selectivity. Generally, an increase of the Si/Al atomic ratio is desirable. However, the framework Si/Al atomic ratio of zeolites prepared by direct synthesis, such as by hydrothermal crystallization, is generally restricted to more or less narrow limits. For example, one of the technically most important members of the zeolite family, faujasite, cannot be directly synthesized with Si/Al atomic ratios substantially higher than 2.5. It is, therefore, of great importance to develop methods for the increase of the Si/Al atomic ratio by chemical modification of zeolite frameworks, such as by the dealumination of zeolites both natural and synthetic.

Processes which increase the silicon-to-aluminum atomic ratio of zeolite structures can be subdivided into the following categories:

a) those involving only the removal of aluminum from the zeolitic framework, thereby resulting in framework vacancies left by the release of aluminum atoms;

b) those including, in addition to the mere extraction of framework aluminum, a second process step in which framework vacancies temporarily left by aluminum release are filled by migrating silicon and oxygen atoms; and c) those representing true substitution reactions between the aluminum component of the framework and the dealumination agent, being a compound of the element to be incorporated, such as silicon.

Barrer and Makki, Canad. Journ. Chem., 1964, 42, 1481–1487 described the removal of aluminum from the crystal structure by leaching with strong mineral acids. This method is restricted to acid-resistant zeolites, such as, for example, mordenite and clinoptilolite.

In U.S. Pat. No. 3,937,791, a method is described comprising the removal of framework aluminum by treating the zeolite to be dealuminated at 50°–100° C. with an aqueous solution of a chromium salt of a mineral acid whereby the pH is less than 3.5.

In U.S. Pat. Nos. 3,442,795 and 4,093,560, aluminum is removed from the framework of the crystalline aluminosilicate by solvolysis, e.g. hydrolysis, and extracted by the use of complexing or chealating agents.

In U.S. Pat. No. 3,640,681, framework aluminum is removed from zeolites by treatment with acetylacetone.

Aluminum has been removed from the framework of zeolites in the form of volatile $AlCl_3$ after reacting the zeolite at elevated temperatures with gaseous chlorine compounds. The application of $Cl_2$ and HCl is described in Ger. Offen. No. 2,510,740, that of phosgene and mixtures of CO and $Cl_2$ was reported by P. Fejes et al. in React. Kinet. Catal. Lett. 1980, 14, 481–488.

In all these processes, lattice vacancies are left behind after the removal of aluminum from the framework of zeolites.

U.S. Pat. Nos. 3,293,192, 3,402,996 and 3,449,070 describe methods of partial dealumination of the ammonium form of zeolites by heat treatment in presence of water or steam. Under the hydrothermal conditions applied, aluminum leaves the framework and is deposited in the form of oxidic aluminum species in the intracrystalline and/or intercrystalline space while framework vacancies are simultaneously filled up by lattice silicon atoms becoming mobile to some extent under said conditions. This process is, at any rate, accompanied by destruction of the lattice in local regions of the zeolite crystallites and, hence, associated with the formation of a mesopore system. Combined with acid extraction of the deposited aluminum oxide species, the steaming of ammonium exchanged zeolites leads to nearly pure $SiO_2$ varieties of the respective zeolites containing zeolitic micropores as well as mesopores.

H. K. Beyer and I. Belenykaja described in Stud. Surf. Sci. Catal., 1980, 5, 203–209 a method for direct substitution of aluminum by silicon in zeolite frameworks. This process comprises contacting dehydrated sodium forms of large-pore zeolites at elevated temperatures with gaseous silicon tetrachloride or silicochloroform. Later, this method was improved starting from Y zeolites partially ion-exchanged with Li or by adding LiCl to Na-Y zeolite (Sulikowski et al., J. Phys. Chem., 1989, 93 3240–3243). The tetrachloro-aluminum complex salt formed as reaction product must be removed by washing with water. This dealumination procedure proved to be a reliable process to prepare the pure $SiO_2$ variety of faujasite. However, it is not possible to prepare partially dealuminated Y zeolites in such a way without formulation of lattice deficiencies because the acidity created during the washing process by hydrolysis of the complex salt affects the aluminum retained in the framework.

In U.S. Pat. No. 4,569,833 framework aluminum is claimed to be substituted by silicon by contacting zeolites at a temperature from ambient to about 200° C. with gaseous silicon tetrafluoride. Cationic aluminum-fluorine species formed as reaction product were removed by subsequent ion exchange.

In U.S. Pat. No. 4,273,753 there is a process for the dealumination of zeolites comprising contacting the dehydrated hydrogen form of zeolites at elevated temperatures with an inorganic halide or oxyhalide, such at $SiCl_4$, $PCl_3$, $TiCl_4$ and $CrO_2Cl_2$. The non-halogen component of these compounds are capable of substitution for aluminum in the zeolitic framework leading to incorporation of other elements.

In U.S. Pat. No. 4,503,023 and J. Catal., 1990, 126, 532–545 (Chauvin, et al) a process is described for the dealumination of zeolites and the simultaneous incorporation of silicon into the framework sites originally occupied by aluminum. The process comprises treating an aqueous slurry of the zeolite with a highly diluted aqueous solution of $(NH_4)_2[SiF_6]$. The dealumination degree achievable via this route is limited to a Si/Al ratio of about 7 in the case of Y zeolite. This process requires handling and disposal of large amounts of salt slurries. Further, because of acidity created by hydrolysis of the hexafluoro-silicate complex, undesired acid leaching of framework aluminum occurs to some extent. In the case of zeolites not resistant to acids, the slurry has to be buffered to avoid lattice destruction. Finally, the fluoroaluminate complex formed as reaction product has to be thoroughly washed in order to avoid structure damages during subsequent heat activation procedures.

None of these references disclose a process for substitution of framework aluminum by silicon in zeolites according to the present invention which comprises solid-state reaction between the zeolite to be dealuminated and the crystalline dealuminizing agent.

J. A. Rabo et al. reported in J. W. Hightower (Editor), Proc. 5th Int. Congress Catal., North-Holland Publishing Co., New York, 1973, pp. 1353–1361 the phenomenon of solid-state ion exchange in zeolites. In the last several years, systematic studies were undertaken to comprehend this type of solid-state reaction proceeding at elevated temperatures between lattice cations of zeolites and metal salts (recently reviewed by H. G. Karge and K. H. Beyer, in *Stud. Surf. Sci. Catal.* 1991, 69, 43–64). In certain systems "contact-induced" ion exchange mediated by intrazeolitic water proceeds even at ambient temperature or slightly higher provided the salt applied as reactant is soluble in water.

In many respects, solid-state ion exchange is superior to the conventional procedure. However, previous solid-state reactions were known to be an adequate method only to modify lattice cation compositions of zeolites while the present invention concerns the application of this type of reaction to chemical modification of zeolitic frameworks.

SUMMARY OF THE INVENTION

This invention contemplates a new method for the dealumination of zeolites with ammonium-fluoro-halo-metallate salts by solid-state reaction performed at temperatures below the decomposition point of the complex salt applied as reactant and to products obtained therewith.

This invention further relates to a novel method for substitution of aluminum in the framework of zeolites by other atoms such as gallium, titanium, zirconium and preferably silicon, via solid-state reaction between ammonium and alkaline metal forms of zeolites and crystalline ammonium fluoro-halo-metallate salts, such as $(NH_4)_2[SiF_6]$ when silicon is to be added. By the aid of the present process the properties of zeolites can be changed and adapted for certain application requirements via controlled variation of the framework Si/Al atomic ratio. The fluoro-halo-metallate salt should be thermally stable at the temperature at which substitution of the framework proceeds and the salt should be small enough to penetrate the pore opening of the zeolite. It is believed pentafluorochloro-metallates and even higher chlorinated metallates would behave principally like the preferred hexafluoro compounds.

In the preferred case of adding silicon with a hexafluoro salt, it was found that ground mixtures of hydrated $NH_4$-zeolites and crystalline $(NH_4)_2[SiF_6]$ react at temperatures between 100° and 200° C., i.e. below the decomposition temperature of $(NH_4)_2[SiF_6]$, under evolution of ammonia according to the reaction scheme:

$$(AlO_{4/2})_zNH_4 + (NH_4)_2[SiF_6] \rightleftharpoons \{SiO_{4/2}\}_z + NH_4[AlF_4] + 2NH_4F \tag{1}$$

$$2NH_4F \rightarrow NH_4HF_2 + NH_3.$$

$\{SiO_{4/2}\}_z$ and $\{AlO_{4/2}\}_z$ refers to primary tetrahedral units of zeolite structures containing Si and Al, respectively, at tetrahedral framework positions (T atoms). The conditions of the heat-treatment were found to be crucial parameters in so far as the reaction of the hexafluorocomplex salt applied as reactant with water adsorbed in the zeolite is concerned. Hydrolysis of the complex salt results in the formation of HF which attacks the crystal structure. Thus, precautions have to be taken to avoid, especially at higher temperatures, high partial water pressures in the environment of the reaction mixture. To maintain optimum conditions, heating up to the reaction temperature must be effected at slow heating rates and in open sample containers.

DETAILED DESCRIPTION OF THE INVENTION

Aluminum is removed from tetrahedral framework sites of zeolite frameworks and is substituted with another element by the following three step process.

In the first step (a) a mixture is formed of the ammonium or alkaline metal form of the zeolites in the hydrated state and a crystalline ammonium fluoro-halo-metallate salt. This mixture is preferably a homogeneous mixture.

The second step (b) is to heat the mixture at an elevated temperature so as to remove aluminum from and introduce a metal from the salt into the structure of the zeolitic component by a solid-state reaction while forming a fluoro-halo-aluminate complex salt.

Finally, the third step (c) is to remove the formed fluoro-halo-aluminate complex salts.

The preferred metals used for substitution are silicon, gallium, titanium or zirconium and when silicon is used the preferred ammonium fluoro-halo-metallate salt is ammonium hexafluorosilicate.

The substitution of framework Al by Si was evidenced by $^{27}Al$ and $^{29}Si$ MAS NMR spectrometry, ion-exchange capacity measurements and X-ray diffractometry. The progression of the reaction was followed measuring both the intensity decrease of X-ray diffractogram peaks typical of $(NH_4)_2[SiF_6]$ and the amount of evolved ammonia. Depending on reaction temperature and time, the formed $NH_4HF_2$ partly or completely volatilizes. The residue can be washed out with water together with the reaction product $(NH_4)[AlF_6]$. In order to minimize lattice damages by acidity of the washing water due to the dissolved reaction product $NH_4HF_4$ or to the hydrolysis of excess $(NH_4)_2[SiF_6]$, it is advantageous to remove first these easily soluble compounds by washing with cold water and then the tetrafluoro-aluminum complex and $AlF_3$ by washing with hot water (80°–100° C).

Using $Na,NH_4$-Y zeolite, the maximum amount of $(NH_4)_2[SiF_6]$ reacting according to reaction scheme (1) was found to be limited to 32 molecules per unit cell corresponding to 4 molecules per large cavity. If $(NH_4)_2[SiF_6]$ is applied in amounts exceeding the limit, the excess complex salt remains unchanged and creates acidity during the subsequent washing process which, in turn, attacks the zeolite framework and results in partial or total lattice destruction. Thus, application of $(NH_4)_2[SiF_6]$ must be limited to a maximum of 32 molecules per unit cell, in the case faujasite, to avoid lattice destructions by undesired secondary reactions. For L-type zeolite, total inhibition of the dealumination process of the present invention was observed after substitution of 3 framework aluminum atoms per unit cell. These limitations point to a product inhibition due to occupation of crystallographic sites the structural environment of which is favorable for coordinative binding of coordinatively unsaturated reaction products, such as $AlF_3$ and $NH_4[AlF_4]$.

The reaction time needed for complete conversion of $(NH_4)_2[SiF_6]$ considerably decreases with increasing reaction temperature. At 150° C. the reaction completely proceeds in 2–3 hours while at 180° C. only 15–30 minutes are needed. The upper limit of the reaction temperature is 200° C. and is limited by the thermal decomposition of $(NH_4)_2[SiF_6]$, the rate of which is no longer negligible at that temperature. $SiF_4$ formed as reaction product of the thermal decomposition of $(NH_4)_2[SiF_6]$ was found to react with framework constituents resulting in lattice damages of the zeolitic phase. The complex salt reacts with zeolites already at 100° C., however, even after long reaction times no complete conversion was obtained at such low temperatures. Decomposition of the $NH_4F$ and elution of the formed $NH_3$ is a precondition for conversion of 32 $(NH_4)_2[SiF_6]$ molecules per faujasite unit cell.

As far as $(NH_4)[AlF_4]$ is not yet completely removed from the mixture, contacting with gaseous ammonia or washing with ammonia solution results in a partial realumination of the framework according to the inversion of reaction scheme in Equation (1) above. This finding indicates that the dealumination process of the present invention is reversible and that the thermodynamic driving force of the reaction is related to the evolution of ammonia.

Two methods are widely used to estimate the aluminum content of zeolitic frameworks (generally expressed at Si/Al atomic ratio or as number of Al atoms in the unit cell). X-ray powder diffractometry provides one of these methods since the lattice parameters easily obtained from diffraction patterns linearly increase with increasing aluminum content of the framework. Information on the coordination state of aluminum in zeolite samples can be obtained by $^{27}Al$ MAS NMR spectrometry and data on the framework Si/Al ratio of a zeolitic phase can be derived from the intensity ratios of $^{29}Si$ MAS NMR signals assigned to Si atoms being connected, via lattice oxygen atoms, to 0, 1, 2, 3 and/or 4 Al atoms, respectively.

It was found that, when a mixture of hydrated $(NH_4)_{0.67}Na_{0.33}$-Y zeolite and $(NH_4)_2[SiF_6]$ ($SiF_6/Al_t = 0.4$; $Al_t$ stands for tetrahedrally coordinated framework aluminum atoms in the zeolitic phase) was heated up to 170° C. in an inert gas stream with a heating rate of 5K/min and then tempered at that temperature for 1 hour, the unit cell parameter of the zeolitic phase decreased from 2.466 nm (corresponding to 54 Al/u.c.) for the starting Y zeolite to 2.447 nm (corresponding to 32 Al/u.c.) pointing to the substitution of framework Al by Si according to the reaction scheme of Equation (1). This conclusion was supported by $^{29}Si$ MAS NMR data which gave Si/Al ratios of 2.6 for the starting Y zeolite and 4.5 for the zeolitic component of the product obtained by heat-treatment. The dealumination of the framework was accompanied and, at least qualitatively, reflected by characteristic changes of distinct X-ray reflections (see Table 1) especially of the low-indexed reflections 111, 220, 311 and 331.

TABLE 1

| hkl | starting mixture[1] d (nm) | intensity[3] | heat treated mixture[2] d (nm) | intensity[3] |
|---|---|---|---|---|
| 111 | 1.4235 | 83 | 1.4051 | 9 |
| 220 | 0.8720 | 12 | 0.8638 | 2 |
| 311 | 0.7422 | 8 | 0.7377 | 29 |
| 331 | 0.5653 | 24 | 0.5609 | 38 |
| 511 | n.d[4] | n.d[4] | 0.4707 | 18 |
| 440 | 0.4356 | 18 | 0.4323 | 13 |
| 620 | 0.3896 | 6 | 0.3865 | 2 |
| 533 | 0.3759 | 24 | 0.3727 | 20 |
| 551 | 0.3451 | 3 | 0.3423 | 3 |
| 642 | 0.3294 | 17 | 0.3267 | 10 |
| 733 | 0.3013 | 5 | 0.2985 | 5 |
| 660 | 0.2904 | 10 | 0.2882 | 6 |
| 555 | 0.2847 | 17 | 0.2823 | 13 |
| 840 | 0.2755 | 6 | 0.2735 | 3 |
| 664 | 0.2627 | 6 | 0.2608 | 3 |
| complex 111 | 0.4843 | 94 | | |

[1] $(NH_4)_{0.67}Na_{0.33}$-Y/$(NH_4)_2[SiF_6]$ mixture ($SiF_6/Al_t = 0.4$)
[2] mixture (1) after heat treatment at 170° C. for 1 hour
[3] arbitrary units
[4] not determinable because of overlapping with the 111 reflection of $(NH_4)_2[SiF_6]$ Batchwise or continuous washing of the obtained product, first with cold water and then with water at 80°–100° C., results in the removal of about 40% of the aluminum originally present in the zeolite and all of the fluorine remaining in the product after the heat-treatment at 170° C. The washing process does not affect the Si/Al framework ratio and the sodium content of the product. The final product is a highly crystalline faujasite-type zeolite with the unit cell composition $Na_{18}(NH_4)_{15}[Al_{33}Si_{159}O_{384}]$.

As revealed by $^{23}Na$ MAS NMR spectrometry, most of the sodium lattice cations (16 out of the total of 18 per unit cell) present in the parent Na,$NH_4$-Y zeolite are located in the truncated octahedra (sodalite units) of the faujasite structure and were found to be not involved in the dealumination reaction provided the heat treatment period is not too long. Long-lasting tempering (>3 hours) of the reaction mixture at the reaction temperature results in the formation of $Na_2[SiF_6]$ detected by XRD as a separate crystalline phase and in a re-increase of the lattice parameter up to 2.458 nm (corresponding to 45 Al/u.c.), i.e. in a re-alumination of the framework. This type of re-alumination is due to the slow migration of sodium lattice cations from sites in the sodalite units into the large cavities where they interfere in the reaction process of Equation (1).

It was found that dealumination also proceeds under similar conditions and to the same extent when hydrated alkaline metal forms of zeolites instead of ammonium forms are subjected to the novel process of the present invention. However, using $Na_2[SiF_6]$ instead of the respective ammonium salt as reactant, the solid-state dealumination of both alkaline metal and ammonium forms was found to be strongly suppressed.

The application of the novel dealumination method described herein is not restricted to faujasite-type zeolites. With minor differences in experimental conditions, it can be applied to dealumination of other zeolites the channel openings of which are large enough to allow the penetration of the reactant, such as e.g. mordenite, zeolite L, zeolite Omega and ZSM-5.

The dealumination process described herein offers the possibility to prepare zeolites with any framework Si/Al ratio up to the limit given by the stoichiometry of the product inhibition simply by appropriate choice of the reaction component ratio in the reaction mixture. However, dealumination degrees exceeding this limit can also easily be achieved subjecting an already dealuminated zeolite repeatedly to the dealumination procedure herein described.

The following examples are representative of the novel process for the dealumination of zeolites.

Example 1

This example illustrates the partial (33%) dealumination of Na,NH$_4$-Y zeolite.

A mixture of 10 g hydrated Na,NH$_4$-Y zeolite containing 3.48 mmole Al, 1.36 mmole Na, 1.76 mmole NH$_4$ and 194 mg adsorbed water per g zeolite corresponding to an unit cell composition of $$Na_{21.7}(NH_4)_{28.0}[Al_{55.4}Si_{136.9}O_{384}] \cdot 194\ H_2O$$

and 2.04 g (11.5 mmole) crystalline (NH$_4$)$_2$[SiF$_6$] was homogenized by grinding in an agate mortar. The mixture was then placed in an open platinum (or teflon) dish with a bed height of about 1 cm, heated in an inert gas stream up to 160° C. with a heating rate of 5K/min and tempered at that temperature for 1.5 hours. The reaction mixture was slurried with water (0.02 parts of reaction product per part slurry) and filtered after 10 minutes. The material being filtered was reslurried to the volume of the preceding step with distilled water, refluxed for 1 hour and filtered again. This step was repeated 3 times until the filtrate proved to be aluminum free. The washed product was then dried at 100° C., characterized by XRD, $^{29}$Si MAS NMR spectroscopy, wet chemical analysis and thermogravimetry and determined to be a highly crystalline faujasite-type zeolite with the Si/Al framework ratio of 4.5 and the unit cell composition $$Na_{21.0}(NH_4)_{22.5}[Al_{34.5}Si_{154.5}O_{384}] \cdot 182\ H_2O$$

Example 2

This example illustrates the partial dealumination of zeolite Na-Y.

A mixture of 10 g hydrated zeolite NaY containing 3.55 mmole Al, 3.11 mmole Na and 226 mg adsorbed water per g zeolite corresponding to an unit cell composition of $$H_{7.3}Na_{50.7}[Al_{58.0}Si_{134.0}O_{384}] \cdot 205\ H_2O$$

and 2.32 g (13.0 mmole) crystalline (NH$_4$)$_2$[SiF$_6$] was homogenized by grinding in an agate mortar. The mixture was then placed in an open platinum (or teflon) dish, with a bed height of about 1 cm, heated in an inert gas stream up to 170° C. with a heating rate of 5K/min and tempered at that temperature for 1.5 hours. The reaction mixture was slurried with water (0.02 parts of reaction product per part slurry) and filtered after 10 minutes. The material being filtered was reslurried to the volume of the preceding step with distilled water, refluxed for 1 hour and filtered again. This step was repeated 3 times until the filtrate proved to be aluminum free. The washed product was then dried at 100° C. and identified by XRD, $^{29}$MAS NMR spectrometry, thermal analysis and wet chemical analysis as highly crystalline faujasite-type zeolite with the unit cell composition $$Na_{25.5}(NH_4)_{11.3}[Al_{36.8}Si_{155.2}O_{384}] \cdot 197\ H_2O$$

Example 3

This example illustrates the partial dealumination of zeolite K,NH$_4$-L.

A mixture of 10 g hydrated zeolite K,NH$_4$-L containing 0.922 mmole K, 0.023 mmole Na, 0.278 mmole NH$_4$ and 103 mg adsorbed water per g hydrated zeolite corresponding to a unit cell composition of $$H_{1.04}K_{2.42}Na_{0.06}(NH_4)_{5.98}[Al_{9.5}Si_{26.5}O_{72}] \cdot 15\ H_2O$$

and 2.42 g (13.6 mmole) crystalline (NH$_4$)$_2$[SiF$_6$] was homogenized by grinding in an agate mortar. The mixture was placed in an open platinum (or teflon) dish, the bed depth being about 1 cm, then heated in an inert gas stream up to 190° C. with a heating rate of 5K/min and tempered at that temperature for 7 hours until the disappearance of the XRD reflections typical of crystalline (NH$_4$)$_2$[SiF$_6$]. The reacted mixture was then slurried with water (0.013 parts of reaction product per part slurry) and filtered after 10 minutes. The material being filtered was reslurried to the volume of the preceding step with distilled water, refluxed for 1 hour and filtered again. This step was repeated 3 times until the filtrate proved to be free of aluminum. The washed product was then dried at 100° C. and identified by XRD as a highly crystalline L-type zeolite with the hexagonal lattice parameters a=1.8272 nm and c=0.7556 nm. As shown by $^{27}$Al MAS NMR spectrometry, the washed final product did not contain significant amounts of extra-framework Al species. The amount of aluminum extracted by the washing procedure corresponded to 3 Al per unit cell of the zeolitic component. The unit cell composition of the final product was found by wet chemical analysis, 29Si MAS NMR spectrometry and the thermal analysis to be $$K_{2.08}Na_{0.04}Na_{0.04}(NH_4)_{4.38}[Al_{6.5}Si_{29.5}O_{72}] \cdot 17.1\ H_2O$$

Example 4

This example illustrates the partial dealumination of NH$_4$-mordenite.

A mixture of 10 g hydrated NH$_4$-mordenite containing 2.39 mmole Al, 2.04 mmole NH$_4$, 0.03 mmole Na and 109 mg adsorbed water per g hydrated zeolite corresponding to an unit cell composition of $$H_{1.0}Na_{0.1}(NH_4)_{6.9}Al_{8.0}Si_{40.0}O_{96}] \cdot 20\ H_2O$$

and 2.17 g (12.2 mmole) crystalline (NH$_4$)$_2$[SiF$_6$] was homogenized by grinding in an agate mortar. The mixture was placed in an open platinum (or teflon) dish, the bed depth being about 1 cm, then heated in an inert gas stream up to 185° C. with a heating rate of 5K/min and tempered at that temperature for 8 hours until the disappearance of the XRD reflections typical of crystalline (NH$_4$)$_2$[SiF$_6$]. The reacted mixture was then slurried with water (0.013 parts of reaction product per part slurry) and filtered after 10 minutes. The material being filtered was reslurried to the volume of the preceding step with distilled water, refluxed for 1 hour and filtered again. This step was repeated 3 times until the filtrate proved to be free of aluminum. The washed product was then dried at 100° C. and identified by XRD as highly crystalline mordenite with the orthorhombic lattice parameters a=1.811 nm, b=2.037 nm and c=0.749 nm. As shown by $^{27}$Al MAS NMR spectrometry, the washed final product contained still significant amounts of extra-framework Al species. Accordingly, the amount of aluminum extracted by the washing procedure corresponded to about 36% of the aluminum originally present in the starting NH$_4$-mordenite.

It is understood that the foregoing detailed description is given merely by way of illustration and that many variations may be made therein without departing from the spirit of this invention.

What is claimed is:

1. A solid-state dealumination process for removing aluminum from tetrahedral framework sites of zeolite frameworks and substitution with another element, said process comprising the steps:
   (a) forming a solid reaction mixture having at least one Component A and at least one Component B, wherein Component A is selected from hydrated ammonium or alkaline metal forms of zeolites and Component B is a crystalline ammonium fluoro-halometallate salt which is thermally stable at the temperature at which substitution within the zeolite frameworks proceeds and which is small enough to penetrate the pore openings of the zeolite;
   (b) reacting Component A and Component B of the reaction mixture in a solid-state reaction by heating the reaction mixture at an elevated temperature to remove aluminum from the zeolite framework and produce (i) a corresponding zeolite framework having another element substituted in place of the aluminum and (ii) a fluoro-halo-aluminate complex salt; and
   (c) removing the fluoro-halo-aluminate complex salt.

2. The process of claim 1, wherein the ammonium fluoro-halo-metallate salt is a crystalline ammonium fluoro-metallate salt.

3. The process of claim 2, wherein the ammonium fluoro-metallate salt is ammonium hexafluorosilicate.

4. The process of claim 1, wherein the reaction mixture is heated between 120° and 210° C.

5. The process of claim 1, wherein the metal is silicon, gallium, titanium or zirconium.

6. The process of claim 5, wherein the element is silicon.

7. The process of claim 1 wherein Component A and Component B of the reaction mixture in step (a) are ground together to produce a homogeneous mixture of small particles.

8. The process of claim 1, wherein the fluro-halo-aluminate complex salt is removed in step (c) by washing with water.

9. The process of claim 1, wherein the zeolite is faujasite, Y zeolite, X zeolite, mordenite, zeolite L, zeolite Omega, ZSM-5, ZSM-11 or ZSM-20.

10. The process of claim 3, wherein the zeolite is faujasite, Y zeolite, X zeolite, mordenite, zeolite L, zeolite Omega, ZSM-5, ZSM-11 or ZSM-20.

11. The process of claim 10, wherein the zeolite is Y zeolite.

12. The process of claim 10, wherein the zeolite is zeolite L.

13. The process of claim 10, wherein the zeolite is zeolite Omega.

14. The process of claim 10, wherein the zeolite is zeolite mordenite.

15. The process of claim 1, wherein the reaction mixture is heated at a temperature below the decomposition point of the crystalline ammonium fluoro-halo-metallate salt.

* * * * *